US005451934A

United States Patent [19]

Dawson et al.

[11] Patent Number: 5,451,934

[45] Date of Patent: Sep. 19, 1995

[54] ELECTRONIC COMBINATION LOCK WITH TIME DELAY FEATURE TO CONTROL OPENING

[75] Inventors: Gerald L. Dawson, Lexington; Daniel L. Thompson, Paris, both of Ky.

[73] Assignee: Mas-Hamilton Group, Lexington, Ky.

[21] Appl. No.: 268,193

[22] Filed: Jun. 29, 1994

Related U.S. Application Data

[63] Continuation of Ser. No. 980,948, Nov. 24, 1992, abandoned.

[51] Int. Cl.[6] .......... G06F 7/04; G06K 7/01

[52] U.S. Cl. .......... 340/825.31; 235/382; 235/382.5; 340/825.33

[58] Field of Search .......... 70/278, 268, 269, 277, 70/270, 77; 364/550; 361/172, 155; 235/382, 382.5; 340/543, 542, 825.31, 825.33

[56] References Cited

U.S. PATENT DOCUMENTS

| | | | |
|---|---|---|---|
| 3,881,171 | 4/1975 | Moorman et al. | 340/543 |
| 3,950,678 | 4/1976 | Brewer | 340/543 |
| 4,060,846 | 11/1977 | Conn | 70/278 |
| 4,106,316 | 8/1978 | Tippin | 70/268 |
| 4,161,721 | 7/1979 | Conklin et al. . | |
| 4,679,031 | 7/1987 | Hwang | 340/543 |
| 4,742,327 | 5/1988 | Burgess et al. | 361/172 |
| 4,755,799 | 7/1988 | Romano | 340/542 |
| 4,803,482 | 2/1989 | Verslycken | 340/825.31 |
| 4,977,765 | 12/1990 | Legault et al. | 70/268 |
| 5,061,923 | 11/1991 | Miller et al. | 340/825.31 |
| 5,091,939 | 2/1992 | Cole et al. | 340/825.33 |
| 5,260,551 | 11/1993 | Wiik et al. | 340/825.31 |

FOREIGN PATENT DOCUMENTS

| | | |
|---|---|---|
| 0361881 | 4/1990 | European Pat. Off. . |
| 2353890 | 12/1977 | France . |
| 1571002 | 7/1980 | United Kingdom . |
| 2219676 | 12/1989 | United Kingdom . |

*Primary Examiner*—Donald J. Yusko
*Assistant Examiner*—David Jung
*Attorney, Agent, or Firm*—Laurence R. Letson

[57] ABSTRACT

An electronic lock is provided with a timer capability to delay the operability of the lock for a preset period of time following the proper and correct entry of a combination into the lock. This delay prevents the lock from opening until both the time has expired and an access code entered following the time delay. If the access code entered after the time delay is incorrect, a further time delay or penalty delay will prevent the operator from an immediate attempt to enter a second access code. If a second access code is entered after the penalty delay and also is incorrect, the entire lock operation resets and the operation of the lock must begin with the re-entry of the correct combination. The entry of a combination to operate the lock which is offset by a predetermined value from the authorized combination will indicate by alarm at a remote monitoring center that the lock is being opened and may be opened under duress to the operator. The combination of the time delay as well as the entry of the alarm combination provide an opportunity for the monitoring center personnel either to react or to notify the appropriate security/law enforcement personnel to respond to a potential robbery.

12 Claims, 5 Drawing Sheets

ELECTRONIC COMBINATION LOCK WITH TIME DELAY FEATURE TO CONTROL OPENING

This is a continuation of application Ser. No. 07/980,948 filed Nov. 24, 1992, now abandoned.

FIELD OF THE INVENTION

This invention relates to electronic locks, and more particularly to permit opening of the electronic lock only after both a time delay and within a time window which follows the time delay from the entry of the authorized code or combination for the lock.

BACKGROUND OF THE INVENTION

Electronic locks provide a very high degree of security. The electronic locks may take any of several forms but particularly electronic combination locks have provided the highest degree of security. Key operated locks which electronically read combinations on keys also may provide a very high degree of security. However, the security of these types of locks is severely comprised in the event an operator is forced to operate or open the safe, vault or other security container while under duress or threat of harm. In the event of an opening by the operator under duress, the lock itself no longer offers a satisfactory degree of security. When a person operating the lock under duress is forced to open the lock or to provide the combination to an unauthorized user, it is known that delayed access to the container for a reasonable period of time is sufficient in many instances to cause the unauthorized user to abandon the attempt to gain access to the contents of the container. Such a delay of access to the container during a robbery may be sufficient to cause abandonment of this effort because of the added apprehension exposure to perpetrators who may not be able to afford the additional time delay inasmuch as it may expose them to the possibility of apprehension by either security or law enforcement personnel.

A lock which thus provides a very high degree of security is the Mas-Hamilton X-07 lock, obtainable from the Mas-Hamilton Group, Lexington, Ky. This lock may be modified and improved to provide a delay function, thereby denying access to any container upon which the lock is mounted, for a predetermined time period once the combination to the lock has been correctly entered. Other electronic locks also may be used for the base of the implementation of the improvement described herein. For example, the time delay may be implemented on an electronic key operated bolt lock of the type described in co-pending patent application Ser. No. 763,119, filed Sep. 20, 1991, for *Electronic Bolt Lock With Enhanced Security Features* by Gerald L. Dawson, et. al., and commonly assigned herewith.

While the delay factor is probably the most significant to prevent unauthorized access to security containers such as vaults, safes or other cabinets, it is a common procedure to notify security personnel or a security agency whenever a lock or a vault is being attacked. When this notification alarm capability is combined with the timed delay briefly described above, the security of the locked container will be further enhanced.

It is common to provide alarms to locked containers which then signal whenever the lock is being attacked or being tampered with; and, this function typically requires electrical conductors or a cable which connects the lock mechanism or the lock frame with an alarm which is displaced from the lock or security container. This alarm is usually referred to as a silent alarm, inasmuch as the signal activates an alarm device at a remote location and gives no indication at the location of the container, that a remote alarm has been activated. The alarm will notify personnel of either a security center or a law enforcement agency of any attempt to tamper with the lock so alarmed.

SUMMARY OF THE INVENTION

OBJECTS OF THE INVENTION

It is an object of this invention to delay the opening of an electronic lock to thwart the unauthorized access to the container upon which the lock is mounted.

It is another object of the invention to delay the opening of the lock to provide a response time for police or security personnel, thereby assisting in the apprehension of the unauthorized operator.

It is still another object of the invention to require a waiting period prior to access to the container being granted by opening of the lock.

It is a further object of the invention to require both an additional waiting period and an additional entry access code in order to open the secure container bearing the lock.

The lock of the present invention is provided with a timing algorithm in the form of software controls to the microprocessor contained within the lock housing, and a timer which starts timing whenever the combination to the lock is entered properly.

Under normal operating conditions the electronic lock, the Mas-Hamilton Group X-07 lock, for example provides an electronic signal to a small stepper motor within the lock housing whenever the correct and authorized combination is entered. This signal to the stepper motor enables the mechanical mechanism of the lock to withdraw the bolt and permit access to the secured container.

Rather than providing the signal to the stepper motor, thereby enabling the operation of the lock, the present invention instead provides a delay function between the COMBINATION COMPARE YES signal and the providing of the operational signal to the stepper motor to cause it to enable the lock to be opened. The timer would begin timing and the microprocessor will determine a preset delay period. The delay period is operator/owner selectable so that the length of time during which the operation of the lock is delayed may be preset by the owner or operator for any period from one minute to ninety-nine minutes in duration. Upon the completion of the delay period, a second time period is started under the control of the timing algorithm. The second time period is a window or period during which an additional access code may be entered to allow the lock to open.

As a further enhancement of the lock to provide a capability to notify either security or law enforcement personnel of an attempt to gain entrance to the security container, the lock is further provided with an algorithm; this algorithm not only compares the combination as entered with the authorized combination stored within the memory of the lock, but also determines whether the value of the combination is exactly (the predetermined offset for example, ten units), larger or smaller than the the authorized combination for that lock as specified by the owner or manufacturer. Upon determination that the combination entered by the operator meets the condition of being either larger or smaller than the authorized combination by this predetermined offset, the processor of the lock will initiate the generation of an alarm signal which then is transmitted over electrical conductors to a remote monitoring station. At the remote monitoring station, any combination being entered which is offset from the authorized combination by a predetermined amount will cause an alarm signal to be generated at the monitoring station. This signal may take any of several forms including an audible alarm, a visual alarm, or an alarm within a monitoring computer system which further may alert the appropriate security/law enforcement personnel.

The alarm signal would be sent at the time the combination is entered into the lock, prior to the beginning of the delay period, thereby providing a period of time during which the law enforcement or security personnel may respond. After the time delay has expired and the microprocessor of the lock would act to time a short period or window during which the lock may be opened, another combination number in addition to the combination already entered is required. Upon the correct entry of that additional number or access code, the lock will be enabled then to open in its normal fashion. Should that access code supplied during the access code time window be incorrect, not only will the lock not operate but also there will be a penalty time period imposed. The penalty time must elapse before any entry of another access code. Thus, access to the locked container will be further delayed by that error. Upon the completion of the penalty time, the access code may be again entered into the lock; and, if incorrect a second time, the lock will then default to a condition wherein the entire operating and opening sequence must be re-initiated and accomplished.

DRAWINGS

Figure 3A:
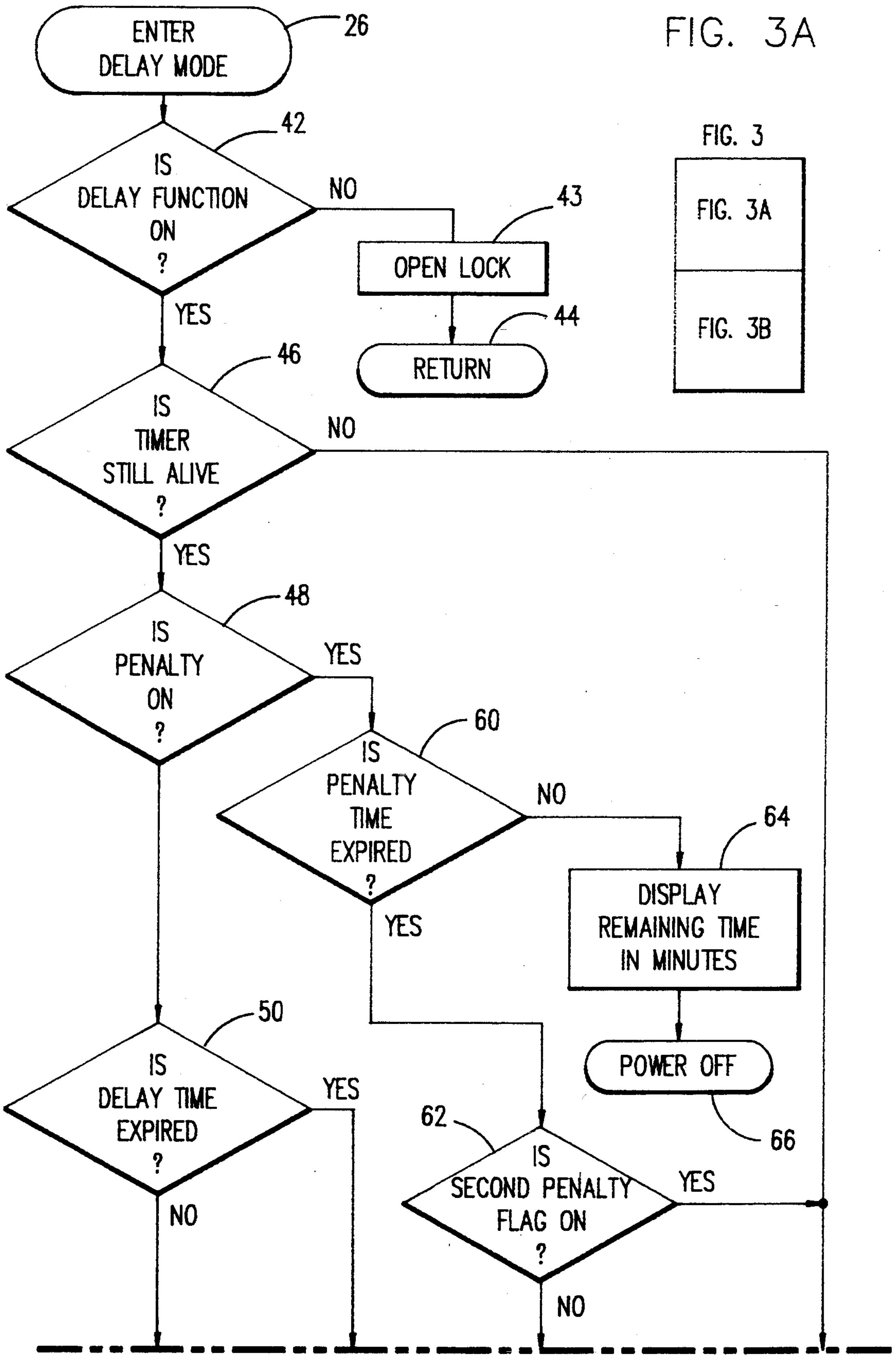
FIG. 3 is a flow diagram of the operation of the delay mode as the delay mode relates to the flow diagram in FIG. 2.

FIG. 3A details the top half of FIG. 3.

Figure 3B:
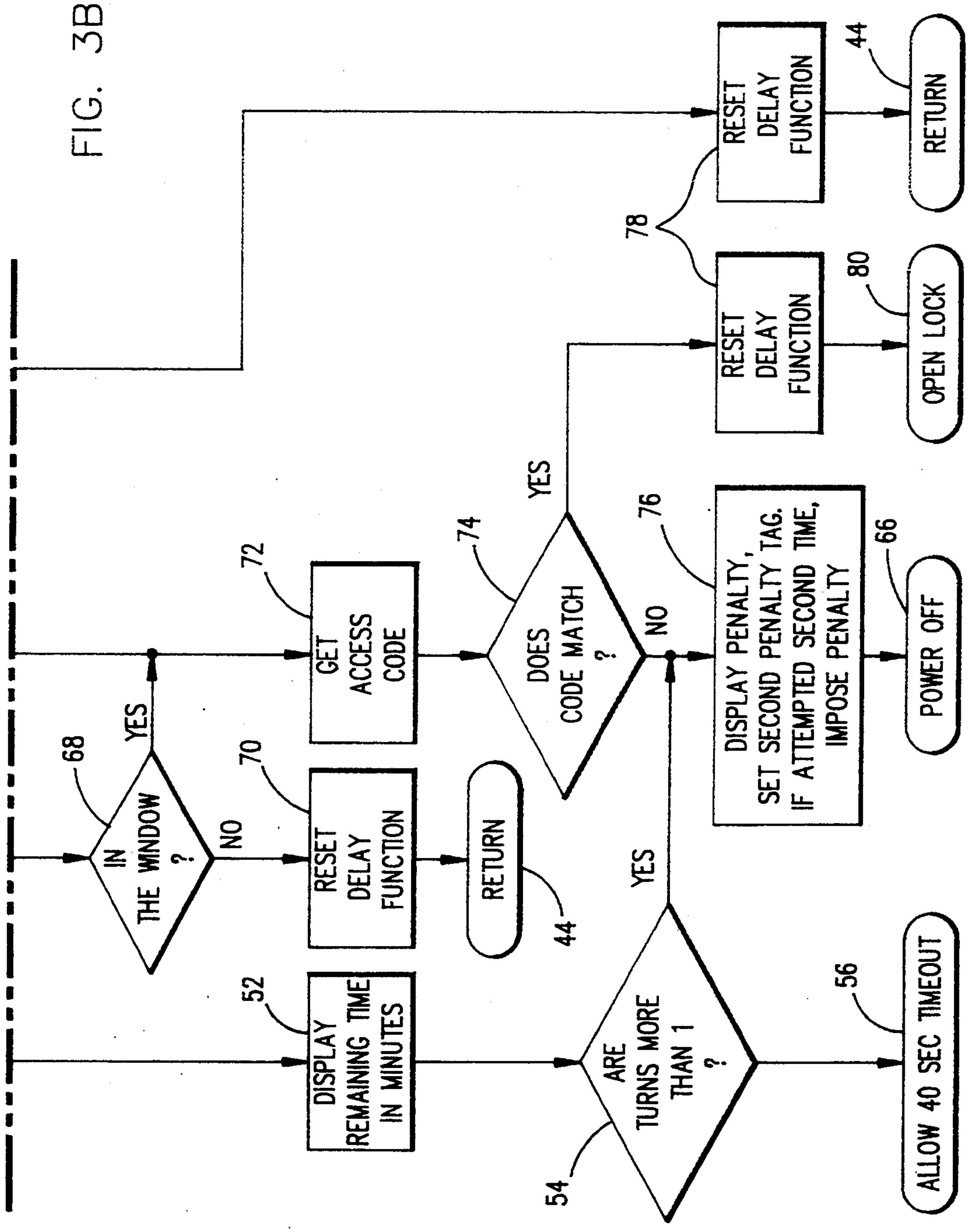

FIG. 3B details the bottom half of FIG. 3.

Figure 4:
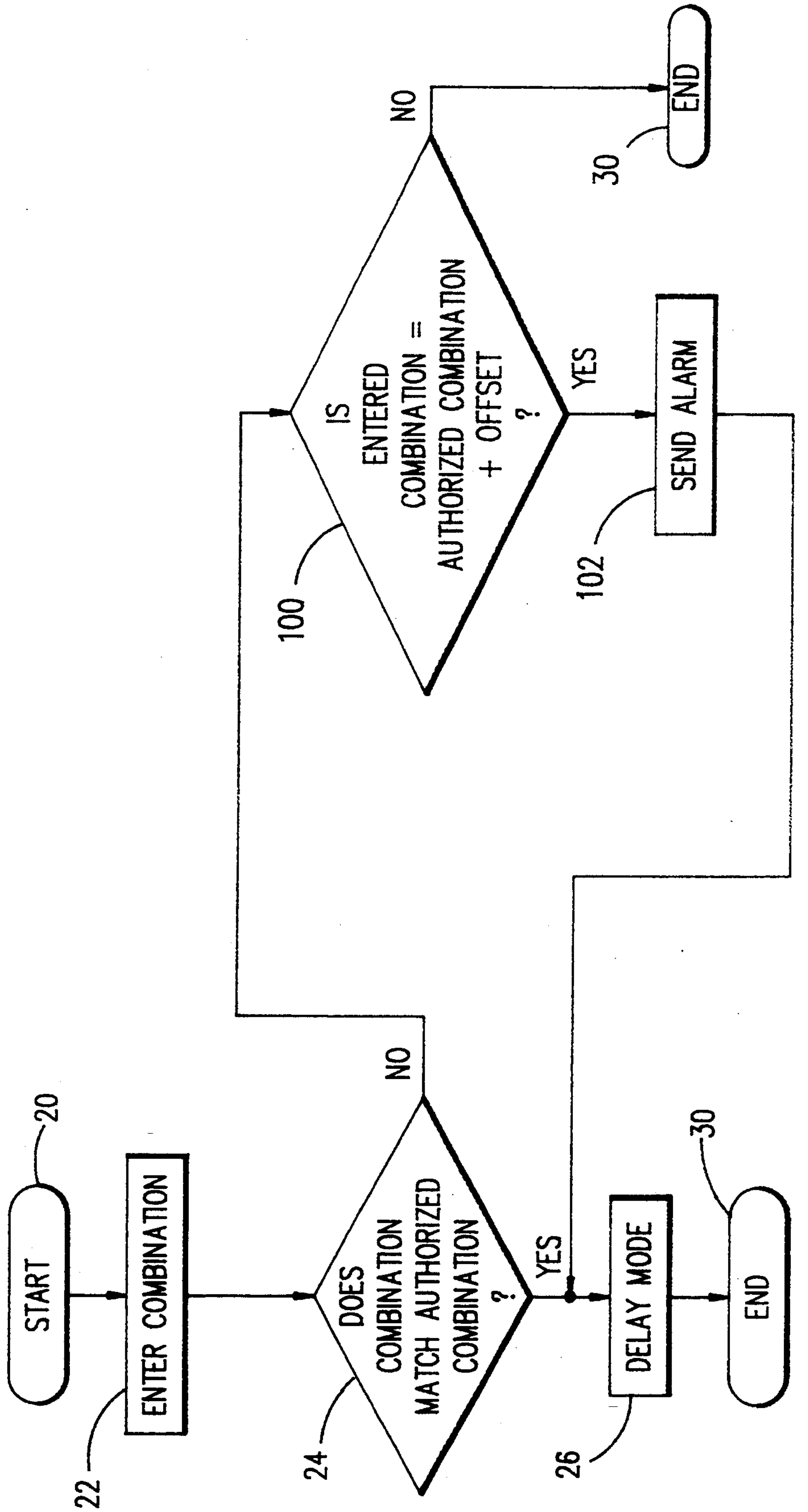

FIG. 4 is a flow diagram illustrating the implementation of the alarm function of the lock.

Figure 5:
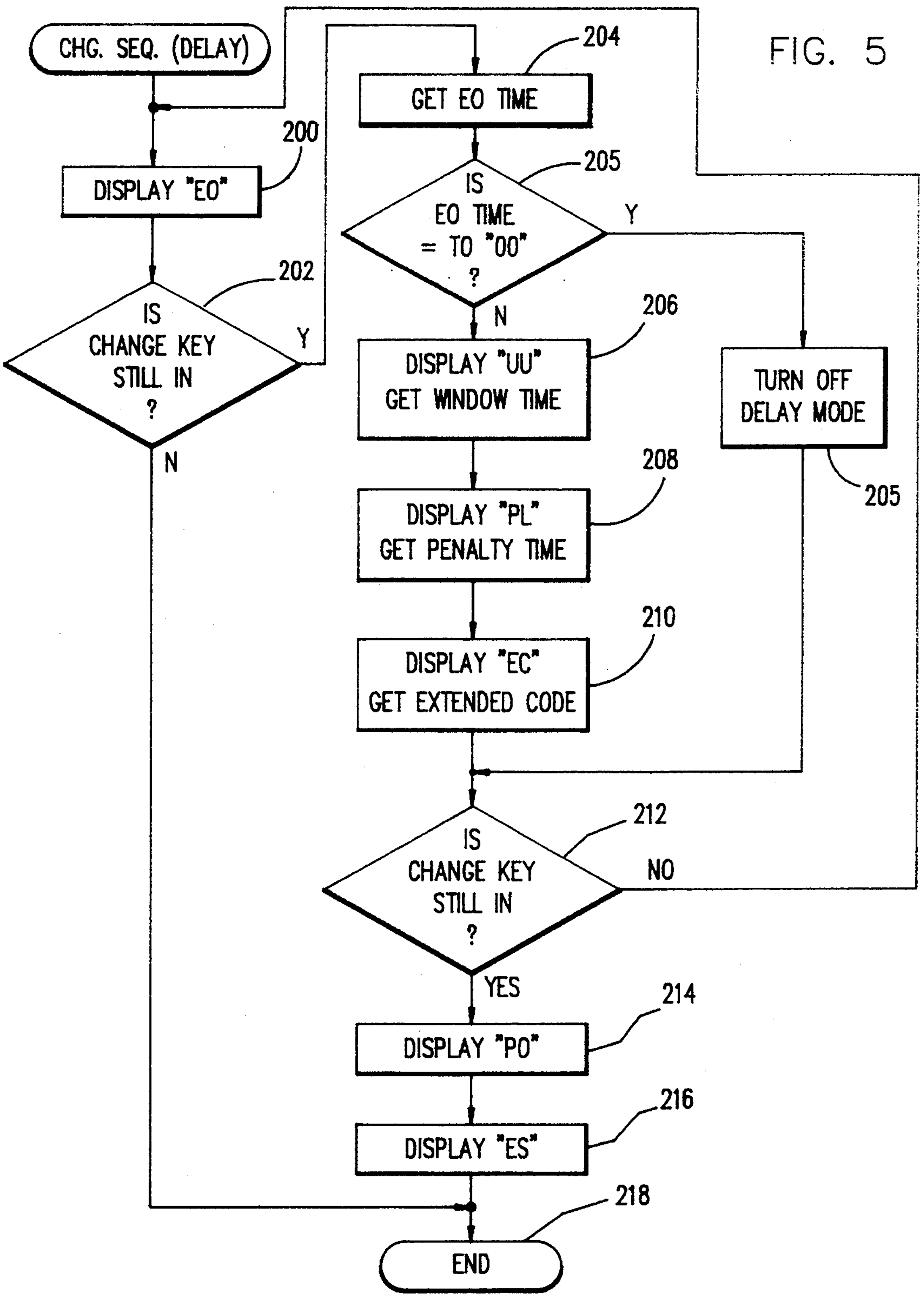

FIG. 5 is a flow diagram illustrating the sequence to select or de-select the delay function on the lock and to enter the parameters selected by the operator.

A better understanding of the invention and how the objects of the invention are accomplished may be derived from the detailed discussion of the invention to follow.

DETAILED DESCRIPTION OF THE PREFERRED EMBODIMENT OF THE BEST MODE CONTEMPLATED BY THE INVENTORS FOR CARRYING OUT THE INVENTION

Figure 1:
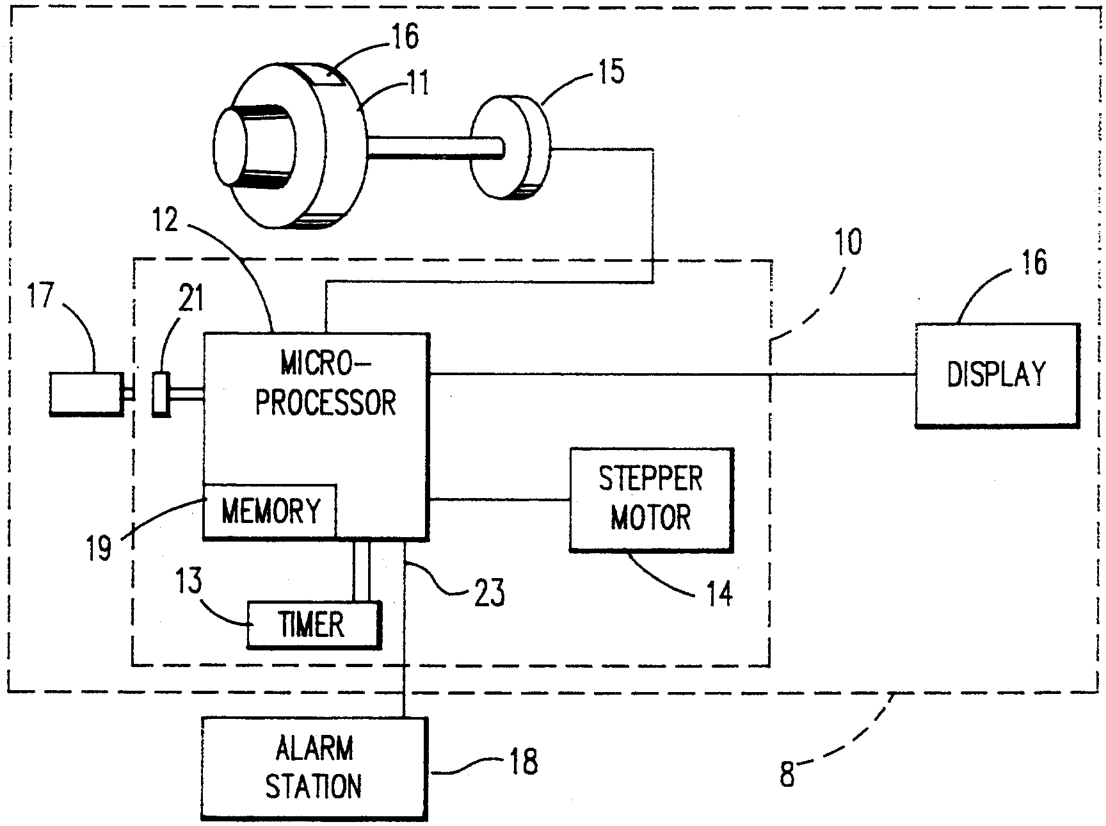
FIG. 1 is a partial schematic of the lock electronics showing the microprocessor, the alarm lines and the alarm station.

Referring to FIG. 1, a dial or input knob 11 is provided and connected to a generator 15, which may be a stepper motor 15. Rotation of the dial 11 will cause generator 15 to provide a series of electrical pulses to microprocessor 12 for interpretation. The interpretation of these pulses is described in co-pending application Ser. No. 07/719,046, filed Jun. 21, 1991, for *Electronic Combination Lock With High Security Features*, by G. L. Dawson, et. al., and is incorporated by reference herein, for purposes of incorporating the description of the lock operation into this application.

The pulse signals from generator 15 are transmitted to the microprocessor 12 to provide the microprocessor 12 with information relative to the increment and the direction of rotation of dial 11. Rotation of dial 11 provides the information necessary in order to enter the combination into the lock electronics shown at 10 and, specifically, to the microprocessor 12. The microprocessor 12, under program control, compares the data entered through dial 11 and generator 15 to determine if the combination entered by the operator compares with the pre-specified combination stored in memory 19, a portion of the microprocessor 12. As the dial 11 is rotated, the microprocessor 12 interprets the pulse train provided by generator 15 and the numbers and symbols necessary for combination entry are shown on display 16, which is positioned typically on the top of dial 11.

The lock electronics 10 are provided further with a change key 17 which may be connected to microprocessor 12. The change key 17 is connectable to microprocessor 12 for the dual purposes of changing the combination, and of setting the operator selectable variables in the time delay function as will be described later.

The lock electronics 10 is further provided with a timer module 13 which runs independently of the microprocessor 12. The microprocessor 12 can query the timer 13 to determine the elapsed time value since its last reset. The microprocessor can then compare the value acquired from the timer 13 with the time values for the delay period, the penalty period and the window to determine at what stage of the opening sequence delay function the lock electronics 10 are in.

Microprocessor 12 is connected electronically to stepper motor 14 so that an enable signal may be provided to the stepper motor 14. The enable signal provided by the microprocessor 12 controls the stepper motor 14 to cause stepper motor 14 to step or rotate a predetermined number of steps, thereby mechanically enabling the withdrawal of the bolt, not shown.

Microprocessor 12 is further connected to a remote alarm station 18. The remote alarm station 18 may comprise a light on an electronic alarm panel or an audible alarm at the remote alarm station or a connection to a computer which would receive the signal and then would activate whatever alarms or messages are appropriate under the program control of the computer which would receive the alarm signal.

The alarm station 18 may be any one of a number of different devices which will function to alert an individual in the vicinity thereof that a condition exists with regard to the electronic lock which requires attention either by personnel monitoring the system, security or law enforcement.

Figure 2:
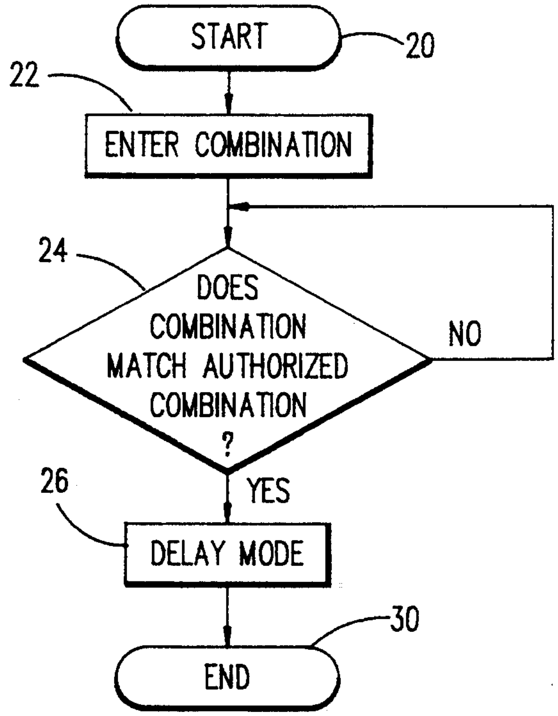
FIG. 2 is a general flow diagram of part of the lock operation.

Referring to FIG. 2, a high level partial flow diagram of the operation of the lock electronics 10 is shown. The start of the logic flow control is at operation 20. The combination is entered by rotation of the dial 11 of FIG. 1 and the numbers indicated by the rotation of the dial 11 then are entered into the microprocessor 12 at operation 22. Thereafter, at operation 24 the combination is compared with the stored authorized combination resident in memory 19 of microprocessor 12, shown in FIG. 1. By means of this comparison, determination is made as to whether or not the entered combination matches the authorized combination; and with a determination of NO, the flow loops back to await further entry of additional combinations.

Upon the determination in the affirmative that the entered and authorized combinations compare, in operation 24, the delay mode is entered at operation 26. The delay mode will be described with respect to FIG. 3.

Upon return from the delay mode 26, the routine terminates at operation 30.

Referring now to FIG. 3, the delay mode 26 of FIG. 2 will be substantially expanded and explained in detail and illustrated as a flow diagram.

Entry of the delay mode is at operation 26, as shown in FIG. 3; the first determination to be made is whether the delay function is set ON at operation 42 by the query IS DELAY FUNCTION ON? The delay function, if not not active has been disabled; and, with a negative determination at operation 42, the logic flows to return the control to the overall systems controls in a return operation at 44. The return operation 44 returns the control to the main flow after the delay mode 26 in FIG. 2.

Conversely, if the delay function is operational and has been turned on, then a determination will be made at operation 46 as to whether timer 13 still is alive. Timer 13 will run or operate for a considerably longer time than the processor 12 can on the power stored in the capacitors of lock 10. The timer 13 is a separate component from the processor 12 to take advantage of this capability. If timer 13 is still alive, the logic flow then is to operation 48 where it is determined whether the Penalty Time still is on. If the Penalty Time is not on, then the Delay Time is tested to determine whether Delay Time has expired, in operation 50. If the Delay Time has not expired, then any remaining Delay Time is displayed in minutes on display 16 as shown in FIG. 1.

Thereafter, any pulse inputs from the stepper motor 15 are tested to determine whether more than one turn of dial 11 has occurred. More than one turn of dial 11 at this time indicates that the operation of the lock electronics 10 is improper and that the operator is not abiding by proper operational procedures and resets the Delay Function 26; the operator is penalized and the penalty imposed. Further the second penalty flag is set. If this is the second penalty time set, then after the expiration of the penalty period the system powers off at operation 66, thus preventing further attempts to operate the lock 8.

If more than one turn of the dial 11 has not occurred, then a forty second timeout is allowed at operation 56, which then shuts down the microprocessor 12 and associated system circuitry. This limits the power consumption and preserves the electrical power for the timer 13. Prior to shutdown, the delay mode flag may be set to allow the restart of the processor 12 in the delay mode 26 when the processor is again powered.

Referring back to operation 46, if the timer 13 is determined to be inactive or not alive, then the delay function is reset at operation 78. Thereafter, the flow is to Return in operation 44.

In operation 48, it is determined whether the penalty is on; in the event that the determination is affirmative, then in operation 60 the penalty time is tested to determine whether it has expired. In the event that the Penalty Time has not expired, the negative path is followed from operation 60 to operation 64 wherein the remaining time of the penalty is displayed in minutes. After the display of this remaining Penalty Time, power to the microprocessor 12 is turned OFF in operation 66.

Should the penalty time have expired, then a determination is made in operation 62 as to whether this is the second time that the penalty time has expired. If the answer is determined in the affirmative, then the flow is to operation 78 where the reset delay function occurs with subsequent flow to operation 44 as described earlier.

In the event that the determination in operation 62 is negative, then the access code, which has been entered into the lock electronics 10 through dial 11 and stepper motor generator 15, is compared with the authorized access code stored in memory 19 of microprocessor 12, at operation 74. Should the two access codes match, the delay function is reset at operation 78 and the lock is conditioned for opening at operation 80.

Should the access codes fail to match in operation 74, then the display then will show the penalty at operation 76 that has been set for the second time and power to the microprocessor will be terminated, in operation 66.

Referring now to operation 50, where a determination as to whether the delay time has expired, if answered in the affirmative, then a determination is made as to whether the total elapsed time places the operational states of the lock 8 within the time window, which is provided for opening of the lock 8, at operation 68. In the event that the elapsed time period is such that the status remains within the opening window, then the access code 72 is acquired and compared with the access code that is stored in the microprocessor 12, in operation 74. From this point, the operation of operations 76, 66, 78, and 80 are as described above.

In the event that the status is not within the time window which permits opening, then the delay function is reset at operation 70 and the logic control returns at operation 44. This prevents the opening of the lock 8 except during the time window provided for the opening operations.

The time period and status is determined by the dial 11 being turned to re-power the lock electronics 10. As the system becomes active upon re-powering, the processor 12 reads the timer and compares the time with that stored in the memory 19 for the delay, window and penalty times. The times are treated as cumulative periods starting with the entry of the correct combination for the lock electronics 10.

Following the flow through this series of flow paths shows that once the combination has been entered correctly the timer 13 begins timing. When the lock 8 is re-powered the elapsed time is compared to the delay time. During the delay time, if the dial 11 on the lock is turned counterclockwise to re-power the lock electronics 10, the remainder of the delay time will be displayed on the display 16 with the symbol, <NN> whereby the "N's" are numbers indicating the time remaining in the delay in terms of minutes, between one and ninety-nine.

Should the dial 11 be turned more than one complete turn after the remaining time of the delay has been displayed, a penalty is imposed. This is to prevent an operator from attempting to enter any further information or to enter data into the lock until the delay period has expired. The penalty imposed will be the preselected and predetermined penalty time plus any remaining unexpired delay time. If the sum of these two times exceed ninety-nine minutes, then the combined total is limited to a maximum of ninety-nine minutes. At the termination of the penalty time, the lock electronics 10 will return to the time window during which the access code may be entered. The return to the time window will only be permitted one time.

In the event that the time window is used for entering the access code and the access code is incorrect, the operator will be given a further opportunity to enter the access code after an additional penalty time. If the second attempt to enter the access code after the expiration of the penalty time is correct the lock 8 will operate. However, if the second attempt to enter the access code is incorrect, then the lock electronics 10 will again invoke a penalty time. At the end of the second penalty time, the lock electronics 10 reset to the original condition which requires the operator again to enter the combination and to wait through the delay time before entering the access code. The entry of the access code is effective only during the window for opening; accordingly, any entry of the access code at other times is ineffective.

If a penalty is imposed, dialing of the lock in a counterclockwise direction will re-power the lock and cause any remaining penalty time to be displayed on display 16.

The alarm may be a signal on a dedicated parallel port on microprocessor 12 or, alternatively, may be a signal on the change key port 21. Once the signal is activated, the alarm will continue to provide an output pulse train (for example, a 5 Hz. pulse) on the alarm line until the processor powers down due to lack of electrical power.

Refer now to FIG. 4 with the alarm feature installed the flow diagram of the operation of the lock is the same as that illustrated in FIG. 2 with one exception; upon a negative determination at operation 24, the flow is to operation 100 where a determination is made as to whether the entered combination is equal to the authorized combination plus the offset, for example, ten. If the entered combination satisfies the requirement for operation 100, then at operation 102 both the alarm is sent and the flow is directed to a point just prior to entering the delay mode at operation 26. Should the determination be made in operation 102 in the negative, then the flow returns to the same point as the negative determination flow path from operation 100.

It should be understood that the ten unit offset is arbitrary and that the lock could be programmed to test for any desired offset either over or under the authorized combination.

While it is desirable to embody the alarm function in a lock having the delay function to permit response during the delay time period, the alarm may be embodied in a lock without the delay function if desired. The alarm function may also be operational even when the delay function is shut off.

In order to select the parameters and to set up the delay function, the change key 17 is inserted into the change key port 21, conditioning the microprocessor 12 for entry or modification of the parameters. With the change key plugged into the change key port 21 of lock 8, the display 16 will display a number between 1 and 4. Numbers 1, 2 and 3 are indicative of modes for changing or setting combinations for the lock 8. Number 4 indicates that the delay function parameters may be set. With "4" displayed, the reversal of dial 11 will enter the delay mode change sequence of FIG. 5. Upon selection of the delay function change sequence, the display 16 will show a <EO indicating that the extended open time or the time delay value may be entered, at operation 200. Thereafter in operation 202 the presence of the change key 17 is verified; and if present the change operation continues with operation 204. Otherwise the subroutine ends at operation 218. Rotation of the dial to change the displayed numbers on the display 16 will cause the numbers to increment sequentially until such time as the desired delay time in minutes is displayed. Reversal of the dial 11 will then enter that time as in operation 204 and cause the delay time or extended open time to be stored. Thereupon, <UU will then appear on the display 16 indicating that the window or the time window for operating the lock 8 be entered as in operation 206.

Rotation of the dial 11 to cause a number to be displayed in increasing sequences then will allow the operator to select the appropriate duration of the window time from one minute to ninety-nine minutes. Again, reversal of the rotation of the dial 11 will cause entry of the selected time and then will increment the control flow to operation 208 where the penalty time may be entered. The display then will display <PL and the rotation of the dial 11 then to display numbers in an increasing incremental direction will allow the operator to select the penalty time period in minutes from 0 to 99. Reversal of the dial 11 will cause entry of the selected highest number and cause the display of <EC representing Extended Code. The Extended Code is the access code which must be entered by the operator during the window time. The rotation of the dial 11 to cause the numbers to increase and stopping the dial at the desired access code or extended code sets the code and the code number is entered by a reversal of the rotation of the dial 11, in operation 210. The extended or access code number may be any number between 00 and 99.

Once the access code is entered by the reversal of the rotation of the dial, the display will display the letters PO indicating that the change key 17 should be pulled out, at operation 214. After the entering of the extended code, the microprocessor 12 will verify in operation 212 that the change key 17 is still engaged. In the event that the change key 17 has been removed prior to the determination made in operation 212, the flow will return to the beginning of the sub-routine and no changes entered prior to that time will be effective.

After the change key pull out command is displayed at operation 214 and the change key removed, the display 16 will then display ES for end set and the setting operation is then ended. The ending of the sub-routine is indicated at operation 218 where the sub-routine is finished.

If the value "00" is entered as the number of minutes for the delay time, the delay mode will be disabled. This is accomplished at operation 205 if the delay time is set equal to "00". If the entered delay time is "01" or to "99" then the flow is to operation 206. When the value entered is "00", the flow is to operation 207 where the delay mode is disabled and the flow is then to operation 212. Should the change key have been removed prior to operation 202, then the flow is directed to operation 218 where the setting of the delay mode is finished.

To summarize the operation of the lock 8 with delay and alarm modes activated, the lock 8 is operated in its normal fashion up to the completion of the entry of the combination necessary to cause the lock 8 to be conditioned for opening. The delay mode then will cause a time delay equal in minutes to the number previously set by the operator. At the end of this delay period, the lock 8 will then be conditioned for opening and will remain in the conditioned state, for the number of preselected minutes; at this point the lock 8 then will become disabled again. The lock 8 must be completely operated from its original starting condition if the appropriate access code has not been entered during the window provided after the delay mode. Should an erroneous access code be entered during this conditioned period, the lock 8 will disable for a predetermined penalty period, at which point it then will again permit the operator to enter the access code. If the access code successfully is entered lock 8 will then open. If the access code is entered erroneously on the second try, the lock will again display a penalty time, at the end of which the lock 8 will return to the condition equivalent to one with no combination entered; and, in order to function, the lock 8 will require the entry of a new combination as well as the wait required through the delay period.

Should the combination entered by the operator be a correct combination except where the last number entered (00–99) is offset by ten units, for example, then lock 8 will function to open as with a valid combination; but, at the same time recognizes this combination as a signal that the operator may have been forced to operate the lock under duress. Under such conditions the microprocessor will output a signal, activating an alarm at a monitoring station 14 which is remote from the secure container. The personnel attending the monitoring station 14 either can respond and give aid or can notify other security personnel or law enforcement officers to respond to a possible robbery situation.

The microprocessor 12 may be replaced by dedicated logic circuits or by an Application Specific Integrated Circuit (ASIC) should that be desired. In any event, the microprocessor, ASIC and dedicated logic circuits are all considered different embodiments of Program Controlled Logic Means.

It should be understood that modifications of a minor nature may be made to the invention as disclosed without departing from the scope of the invention as defined by the claims hereof.

We claim:

1. An electronic combination lock comprising:

an electronic logic control means for controlling operation of said lock;

an input means for inputting operating parameters to said logic control means, said parameters comprising at least a combination, a delay time value, a window time value, a penalty time value, said time values representative of respective time periods, and an access number;

an electronic timer for timing a period and providing a timer value beginning with successful entry of a combination;

said electronic logic control means comprising:

means for receiving from said input means and storing said parameters;

comparing means for comparing said combination with an authorized combination and for comparing said access number with an authorized access number;

a determining means for determining when said timer value equals or exceeds said delay time value, and for determining that said timer value does not exceed said delay time value and said window time value combined;

a first conditioning means responsive to said determining means for conditioning said lock during said window time value to accept said access number for validation by said comparing means; and a second conditioning means responsive to said comparing means for conditioning said lock to be opened only upon a favorable comparison of said access number with said authorized access number;

whereby said lock may only be opened after entry of an authorized combination, waiting a predetermined time period and entering said access number.

2. The lock of claim 1 wherein said input means comprises a rotatable dial.

3. The lock of claim 2 wherein said logic control means comprises a means for detecting rotation of said dial and for detecting rotation of said dial in excess of a predetermined amount during a period when said timer value is less than said delay time value.

4. The lock of claim 1 wherein said logic control means further comprises means, responsive to an incorrect access number, for delaying acceptance of any further access number by a penalty time period.

5. The lock of claim 4 wherein said logic control means further comprises means responsive to said means for delaying acceptance for counting each operation of said means for delaying and when said means for delaying has functioned a predetermined number of times, terminating operation of said lock.

6. The lock of claim 1 wherein said logic control means comprises means for detecting any of a plurality of conditions and for adding a penalty time value to any unexpired delay time value or the present timer value upon detection of any one of said conditions, said conditions comprising:

electrical signals representing operation of said input means in excess of a predetermined amount; and electrical signals representing entry of an incorrect access number.

7. The lock of claim 4 wherein said logic control means comprises means for counting and maintaining a count of every operation of said means for delaying acceptance of any further access number and means responsive to said means for counting for resetting said lock to an initialized condition requiring entry of an authorized combination upon said count exceeding a predetermined number.

8. The lock of claim 1 wherein said lock further comprises a display for displaying numbers and symbols under the control of said logic control means, and said logic control means comprises means for controlling said display for displaying graphic symbols representative of the length of time remaining in said delay period.

9. An electronic combination lock comprising a delay function comprising:

an electronic combination lock having an input means for entering a combination and for entering a further access number;

a program controlled logic control means for validating said entered combination of said lock, and for validating said entered further access number;

an electronic timer means, responsive to said program controlled logic control means for timing an elapsed time period starting with said validating of said combination;

said program controlled logic control means comprising:

delaying means responsive to said timer means for preventing entry of said access number into said logic control means and preventing the opening of said lock until said elapsed time period shall have exceeded a predetermined delay time period and shall not have exceeded a second predetermined time period immediately following said delay time period and until said access number has been validated, a means for detecting an incorrect access code and responsive to said detecting of said incorrect access code for imposing a subsequent penalty period following detection of said incorrect access code, and means for preventing opening of said lock in response to any action taken during said subsequent penalty time period.

10. The lock of claim 9 wherein said program controlled logic control means further comprises a means for detecting operation of said input means by more than a predetermined amount during said delay time and means responsive to said detecting of said operation of said input means by more than a predetermined amount for increasing said delay time period by a predetermined penalty time.

11. The lock of claim 10 wherein said program controlled logic control means comprises means responsive to imposition of a second penalty period for resetting said lock to a state requiring the entry of a combination to further operate the lock.

12. An electronic combination lock of claim 9 further comprising:

a memory, said memory storing at least one authorized combination for opening said lock;

a program controlled logic control means for comparing said combination with said authorized combination;

means responsive to said means for validating said combination for providing an output for enabling said lock to open upon a validation of said combination and validation of said access number;

first means responsive to said program controlled logic control means for comparing for determining that said combination differs from said authorized combination by a predetermined offset amount and for issuing an alarm signal when said combinations differ by exactly said predetermined offset amount, and second means responsive to said means for determining for providing an output for enabling said electronic timer means upon a favorable determination that said combination differs from said authorized combination by said predetermined offset amount.

* * * * *